United States Patent [19]

Ess

[11] 4,392,401

[45] Jul. 12, 1983

[54] APPARATUS FOR STAGGERED CUTTING OF PLANAR WORKPIECES

[75] Inventor: Wilfried Ess, Schwarzach, Austria

[73] Assignee: Schelling & Co., Schwarzach, Austria

[21] Appl. No.: 265,368

[22] Filed: May 20, 1981

[30] Foreign Application Priority Data

May 21, 1980 [AT] Austria .................. 2725/80

[51] Int. Cl.³ .............................................. B27B 5/06
[52] U.S. Cl. ........................................ 83/219; 83/36; 83/272; 83/153; 83/417; 83/409.1; 83/471.3; 83/436
[58] Field of Search ............. 83/272, 408, 467, 471.3, 83/404.2, 417, 705, 706, 409.1, 436, 219, 36, 153

[56] References Cited

U.S. PATENT DOCUMENTS

| | | | |
|---|---|---|---|
| 2,107,968 | 2/1938 | Uline .................... | 83/272 |
| 3,691,887 | 9/1972 | Roch .................... | 83/219 X |
| 3,890,861 | 6/1975 | Gebhardt ............... | 83/471.3 X |
| 4,054,070 | 10/1977 | Steiling ................. | 83/408 X |
| 4,065,991 | 1/1978 | Benuzzi ................. | 83/272 |
| 4,181,054 | 1/1980 | Striebig ................ | 83/471.3 X |
| 4,206,670 | 6/1980 | Benuzzi ................. | 83/404.2 |

Primary Examiner—Donald R. Schran
Attorney, Agent, or Firm—Toren, McGeady and Stanger

[57] ABSTRACT

Apparatus for cutting planar workpieces including a saw movable through a cutting stroke in a substantially horizontal direction with a first and a second table being provided on opposite sides of the saw. The planar workpieces are first fed from the first table onto the second table through a first cutting operation and the cut parts are rotated relative to the saw on the second table and then fed through a second cutting operation back onto the first table. A pusher device is provided on the second table for feeding the planar cut parts and a feeding device on the first table operates to selectively feed planar strips from the first table to the second table. The first table is provided with two sets of rollers capable of conveying planar parts in two transverse directions with the sets of rollers being vertically displaceable relative to each other.

4 Claims, 10 Drawing Figures

APPARATUS FOR STAGGERED CUTTING OF PLANAR WORKPIECES

The present invention relates generally to cutting apparatus and more particularly to a sawing mechanism for cutting planar workpieces. The apparatus of the invention includes a saw which is movable substantially in a horizontal direction through a generally vertical cutting plane with a machine table extending in the moving direction of the saw. Support tables are arranged on opposite sides of the saw, respectively, and staggered cutting of the workpieces is effected by selective passage of the workpieces from one side of the saw to the other.

Devices of the type to which the present invention relates have been developed mainly for small- and medium-sized industrial operations with the aim of maintaining the amount of machinery as small as possible. In such installations, equipment for staggered division of workpieces utilizing several sawing machines would not be cost-effective, either from the viewpoint of the production capacity or from the viewpoint of finances. With devices of this known type, large-sized plates are divided into individual workpieces for immediate further processing. This dividing operation takes place linearly but there are may also be made provisions for staggered division of workpieces with single or double transverse offsetting. In this regard, cutting patterns with linear division have been found to be not sufficiently efficient from the point of view of material utilization as compared with cutting patterns involving so-called staggered division. With known devices, staggered division of workpieces may be undertaken, but only with the utilization of manual procedural operations.

In certain cases, workpieces lying on the table after having been cut by the saw must be removed and pushed onto a deposit table which is arranged laterally. Other strips or strip areas are pushed through the saw and then divided transversely. A subsequent package of strips must then be taken from deposit tables in order to undergo the procedure previously mentioned. This is found to be very impractical and time consuming.

The present invention is aimed toward enabling improvement of known devices in such a manner that with only minor additional structural modifications, more optimum performance of automatic staggered cutting may be achieved in accordance with the invention by the combination of relatively simple means.

SUMMARY OF THE INVENTION

Briefly, the present invention may be defined as apparatus for cutting planar workpieces comprising saw means movable through a cutting stroke in a substantially horizontal direction, first table means on one side of the saw means, second table means on the opposite side of the saw means, adjustable alignment means for aligning on the first table means planar workpieces to be cut by the saw means, first feeding means including a plurality of individual clamping devices which are selectively operable to selectively individually engage planar workpieces on the first table means to feed the workpieces through a cutting operation relative to the saw means, with cut parts of the planar workpieces being thereby deposited on the second table means, pivot means on the second table means for turning the cut parts of the planar workpieces relative to the saw means, second feeding means for feeding the cut parts of the planar workpieces through a cutting operation relative to the saw means with parts thereof thus cut being deposited back on the first table means, and roller means on the first table means including first roller devices operable to allow planar workpieces deposited thereon to move in one direction and second roller devices operable to allow planar workpieces deposited thereon to be moved in another direction transversely of said first direction, with said first and said second roller devices being vertically displaceable relative to each other.

Thus, in accordance with the present invention, the first table means is provided with first feeding means which involve clamping devices which are individually controllable. Furthermore, the first table means over which this feed mechanism travels is formed with two groups of rows of freely rotatable rollers, the turning axles of one of the groups of rollers being parallel to the cutting plane of the saw and the turning axles of the other group of rollers being arranged perpendicularly thereto, with one group of rollers being mounted so as to be capable of being raised and lowered with relation to the other group.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
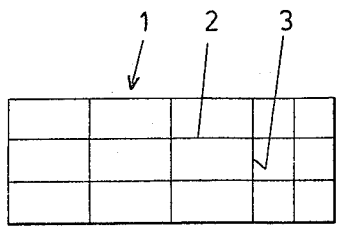
FIGS. 1, 2, and 3 are plan views showing planar workpieces and different cutting patterns therefor.
Figure 2:
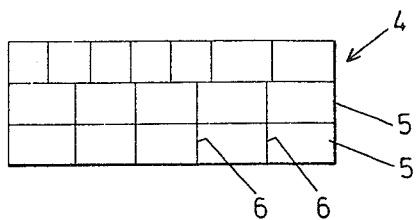
Figure 3:
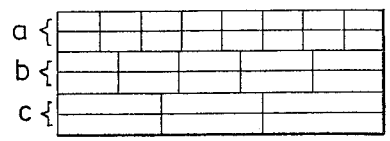
Figure 10:
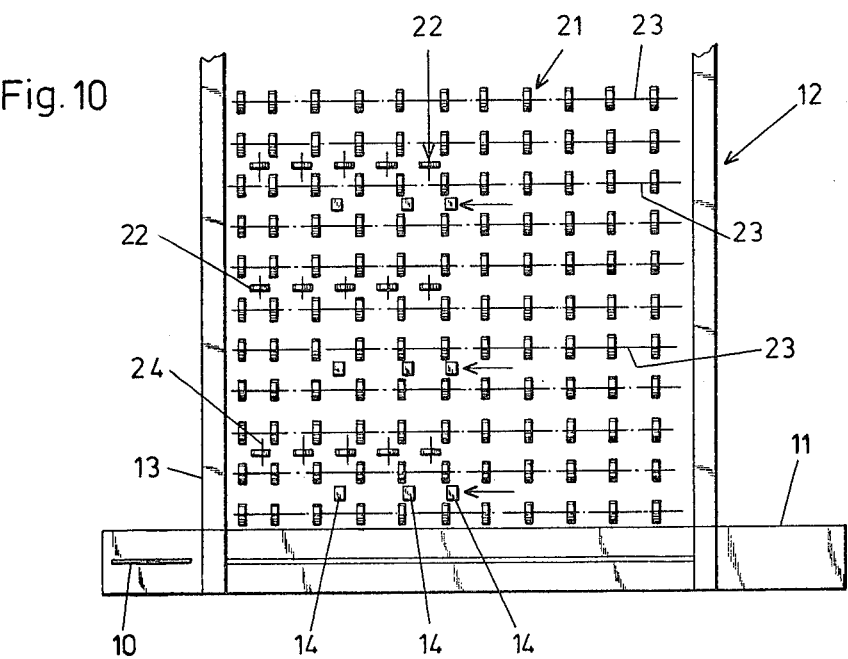
FIG. 10 is a top view on an enlarged scale showing a support table in accordance with the invention arranged on one side of the saw of the apparatus.

Referring now to the drawings, wherein like reference characters are used to refer to similar parts in the various figures thereof, there is shown in FIGS. 1, 2, and 3, respectively, different cutting patterns which may be utilized in the division of planar workpieces. In FIG. 1 there is shown a large planar workpiece 1 which has been marked with a cutting pattern thereon which involves longitudinal and transverse cutting lines 2 and 3. This type of cutting or division is referred to as linear division. The individual cut lines each extend linearly over the width or the length of the planar workpiece and lateral offsetting of the cut lines is not indicated in FIG. 1.

FIG. 2 shows a large planar workpiece 4 with a simple transverse offsetting of the cut lines wherein staggered division of the workpiece is involved. Longitudinal strips 5 which, over their width, have transverse cut lines 6 extending in like manner, each form a strip area.

In FIG. 3 there is shown a staggered form of division wherein double transverse offsetting is involved. The cutting pattern depicted in FIG. 3 shown three strip areas a, b, and c.

The apparatus of the invention is shown in greater detail in FIGS. 4 through 9, each of which is a top view of the device of the invention shown in various stages of operation thereof. As indicated in the drawings, the apparatus consists of a circular saw 10 which is a below-the-table saw wherein the saw blade travels along a machine table 11 during the cutting process. The saw blade is driven in a manner whereby it can be displaced along an area below the machine table 11. Upon conclusion of a cutting stroke, the saw blade is lowered below the table and runs under the table back to its initial position whereupon it may be raised and moved again through a subsequent cutting stroke.

A support table 12 is provided on one side of the saw 10 and a lateral alignment ledge 13 operates to enable workpieces to be cut to be aligned on the table 12. Several stop or alignment members 14 are provided which are capable of being adjusted in position relative to the alignment ledge 13.

Planar workpieces to be cut are propelled by a feeder carriage 15 which is adapted to be driven toward and away from a cutting plane 16 of the saw 10. The feeder carriage 15 is mounted above the support table 12 and is equipped with several clamps 17 which are pivotable from an active clamping position into a raised, non-active. The individual clamps 17 are individually controllable to grasp or release a planar workpiece or strip.

On the opposite side of the cutting plane 16 of the saw 10 there is mounted a pivotable support table 18 which may be pivotally displaced alongside the machine table 11. The table 18 is equipped with a pushing device 19 mounted above the table 18 and movable toward the machine table 11, the pushing device 19 being most appropriately constructed in such a manner that it can push workpieces not only toward the saw, but also away from it.

The installation is fully automated and program controlled and individual steps of operation thereof may proceed automatically, as will be more fully discussed hereinafter.

Figure 4:
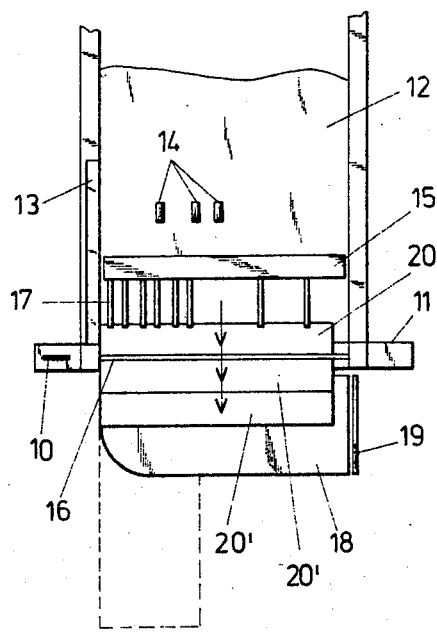
FIGS. 4 through 9 are top views showing the apparatus of the present invention during different stages of operation thereof.

In the operation of the apparatus in accordance with the present invention, a single planar workpiece or a stack 20 of planar workpieces may be placed on the support table 12, as best seen in FIG. 4, by the action of an appropriate transport device (not shown). During this time the pivoting table 18 will assume a position as shown in FIG. 4. The feeder carriage 15 is at its rearmost position. After being duly programmed, the installation is switched on.

Clamps 17 of the feeder carriage 15 grip the planar workpiece package 20 at its edges and push it toward the saw 10 which, in consecutive steps, may be operated to cut the workpiece package 20 into individual strips in accordance with a pre-programmed cutting pattern.

During the cutting operation, the single workpiece or stack of workpieces 20 is of course held stationary and is pressed against the machine table with a clamping bar or pressure beam. Such clamping bars or pressure beams are, however, known in different variations. Thus, in the operation of the installation, the feeder carriage 15 operates so that the cut strips or parts 20' will be deposited onto the pivoting table 18.

Figure 5:
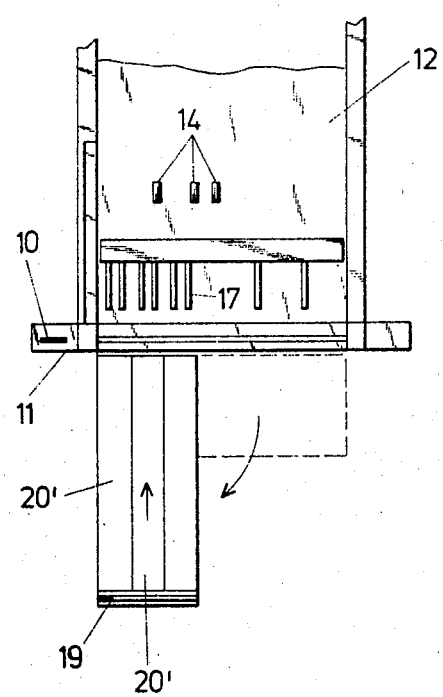
Figure 6:
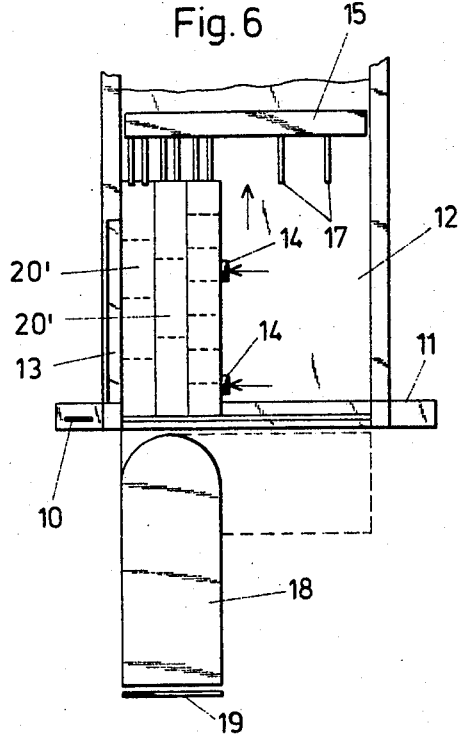

After the stack of planar workpieces 20 has been entirely cut into strips 20', the pivoting table 18 is pivoted through 90° as shown in FIG. 5 and the pushing device 19 is brought into action so as to push the strips 20', which also have been pivoted through an angle of 90°, back onto the support table 12 as seen in FIG. 6.

The feeder carriage 15 in the meantime is returned from its forward end position into its rearward initial position. Simultaneously, the clamps 17 are opened and raised. In each of the FIGS. 4 through 9, the clamps are represented in their active setting (lowered and gripping the workpieces) by dark surfaces whereas the raised, non-active clamps are only indicated by their outlines. This also applies to the alignment members 14 which will be discussed further hereinafter.

The sizes into which the individual strips are cut is indicated in FIG. 6 in broken lines. The alignment members 14 will now be activated in a program-controlled manner, the alignment members pressing in their entirety against the stopping ledge 14 and thus positioning the workpieces. At this stage, two of the clamps of the feeder carriage 15 may be activated to grip the strip lying against the stopping ledge 13, as seen in FIG. 6, and then operate to push it forwardly toward the saw 10 which now also will be activated in program-controlled manner to perform the indicated cuts.

Figure 7:
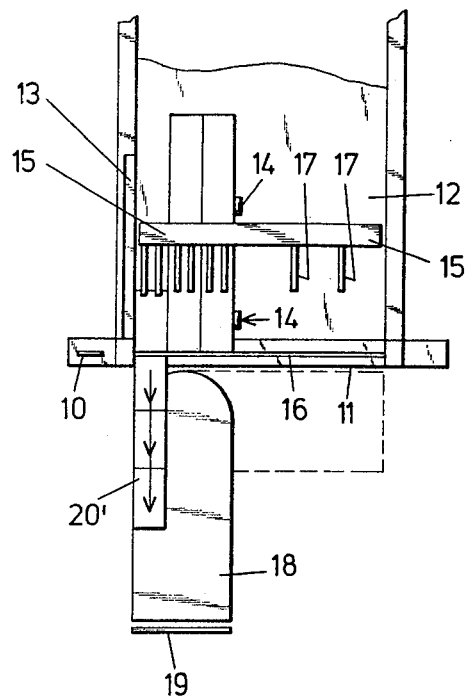

During displacement of this leftmost strip, the alignment members 14 will be out of action. The process of forward pushing of the strip is represented in FIG. 7.

Once this first strip has been cut entirely, then the separated cut parts which will now lie on the pivoting table 18 may be pushed by the pushing device 19 toward a stacking device (not shown).

Figure 8:
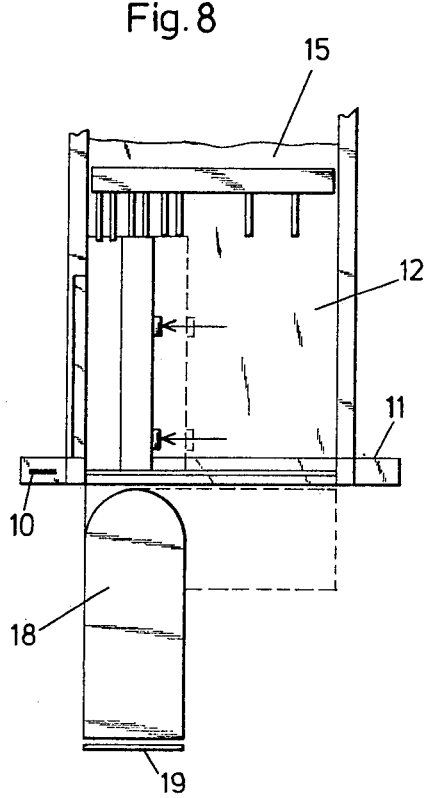
Figure 9:
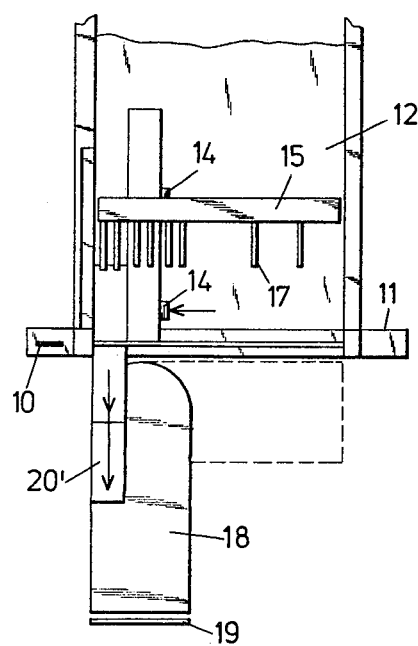

The feeder carriage 15 is then driven back again into its initial position, as shown in FIG. 8, and the alignment members 14 operate to push the remaining strips 20' on the support table 12 against the stopping ledge 13 and to consequently straighten the strips. The next strip is then pushed forwardly toward the saw 10 which is activated to perform the subsequent cutting operation, as depicted in FIG. 9. Once this process is completed, a similar operating procedure of the type previously described is then commenced for a third strip 20'.

In order to enable movement of the strips 20 on the support table 12 with minimum interference in the longitudinal as well as in the transverse direction, the support table 12 is equipped with two groups of rows 21 and 22 of freely rotatable rollers, which may particularly be formed as circular discs, with turning axes 23 of the discs of one group being parallel with the cutting plane 16 of the saw 10 and with turning axes 24 of the other group of discs being arranged perpendicularly to the cutting plane. The rows 21 of the rollers are spaced apart from one another and in the spaces thus created there are situated rows of the other roller bodies. The rows 22 are mounted so as to be capable of being raised with relation to the other rows. Thus, the roller means described are vertically displaceable relative to each other. The support plane formed by the roller bodies of the rows 21 will be on the same level as the plane of the machine table 11. The roller bodies of the rows 21 support the workpieces while they are being moved toward the saw 10. During the alignment process, that is, when the alignment members press the strips against the alignment ledge 13, the rows 22 are raised slightly so that during this alignment the workpieces rest on the roller bodies of the rows 22. On the support table 12 structured in this manner, even plates having sensitive surfaces may be moved without damage caused by the support surfaces. The roller bodies of the rows 21 spaced apart from one another will delimit groove-like formations through which there may travel the lower clamping jaws of the clamp 17 during the pushing process. The roller bodies of the rows 22 are lowered during the pushing operation to such an extent that the lower active clamping jaws may slide over the roller bodies of the rows 22 without further impediment.

In the embodiment shown, the pivoting table 18 is coordinated with the sawing apparatus. It would be fundamentally possible to provide, instead of a pivotable support table, a table which is stationary and to mount above this table a pivotable frame which may be provided with clamps with which the planar workpieces may be gripped and rotated through 90° on the stationary table.

In the embodiment shown, the support table 12 arranged with relationship to the operating sequence in advance of the saw 10 is equipped with two groups of rows of differently arranged roller bodies in order that the planar workpieces having highly sensitive surfaces may be pushed in two different directions without any damage being caused to these sensitive surfaces. Instead of the disc-shaped roller bodies described, they may also be provided spherical or ball-like roller bodies which permit unimpeded and unrestrained movement of the planar workpieces in the planes in which they lie. It would also be possible to provide cushioning coverings on which the workpieces are movable and also air cushion tables whereby the plates may be lifted slightly and may be moved within their own planes. All of these possibilities are included and contemplated within the scope of the invention.

As a result of the present invention, it is possible to perform staggered division of workpieces in installations having a simple construction with a single cutting saw of the type described in an automatic process without necessitating manual operating procedures so that even with such machines advantageous performance can be achieved pursuant to the present invention.

While a specific embodiment of the invention has been shown and described in detail to illustrate the application of the inventive principles, it will be understood that the invention may be embodied otherwise without departing from such principles.

What is claimed is:

1. Apparatus for cutting planar workpieces comprising: saw means movable through a cutting stroke in a substantially horizontal direction; first table means on one side of said saw means; second table means on the opposite side of said saw means; adjustable alignment means for aligning on said first table means planar workpieces to be cut by said saw means; first feeding means including a plurality of individual clamping devices which are selectively operable to selectively individually engage planar workpieces on said first table means to feed said workpieces through a cutting operation relative to said saw means, with cut parts of said planar workpieces being thereby deposited on said second table means; pivot means on said second table means for turning said cut parts of said planar workpieces relative to said saw means; second feeding means for feeding said cut parts of said planar workpieces through said saw means with parts thereof being deposited back on said first table means; and roller means on said first table means including first roller devices operable to allow planar workpieces deposited thereon to move in one direction and second roller devices operable to allow planar workpieces deposited thereon to move in another direction transverse to said first direction; said first and said second roller devices being vertically displaceable relative to each other.

2. Apparatus according to claim 1 wherein said second feeding means of said second support table comprise a pushing device common to all workpieces.

3. Apparatus according to claim 1 wherein said first roller devices comprise roller bodies rotatable about parallel axes extending in a first direction and wherein said second roller devices comprise roller bodies rotatable about parallel axes extending in a second direction, said first direction and said second direction being perpendicular to each other.

4. Apparatus according to claim 3 wherein one of said first and said second directions extend parallel to the cutting plane of said saw means and wherein the other of said directions extends perpendicularly to said cutting plane.

* * * * *